United States Patent
Steward

(10) Patent No.: US 6,265,438 B1
(45) Date of Patent: Jul. 24, 2001

(54) VITAMIN COMPATIBLE MICRONUTRIENT SUPPLEMENT

(75) Inventor: Frederick A. Steward, Pittsburg, PA (US)

(73) Assignee: Heritage Technologies, LLC, Indianapolis, IN (US)

( * ) Notice: Subject to any disclaimer, the term of this patent is extended or adjusted under 35 U.S.C. 154(b) by 0 days.

(21) Appl. No.: 09/452,221

(22) Filed: Dec. 1, 1999

Related U.S. Application Data

(60) Provisional application No. 60/110,800, filed on Dec. 3, 1998.

(51) Int. Cl.⁷ .................................................. A61K 31/28
(52) U.S. Cl. .............................................................. 514/492
(58) Field of Search ............................................. 514/492

(56) References Cited

U.S. PATENT DOCUMENTS

| | | |
|---|---|---|
| 1,592,173 | 7/1926 | Bardt . |
| 2,044,366 | 6/1936 | Pierson ................................. 75/108 |
| 2,295,643 | 9/1942 | Emery et al. ............................. 99/2 |
| 2,359,413 | 10/1944 | Freedman ............................. 167/81 |
| 2,760,866 | 8/1956 | Nielsen .................................... 99/2 |
| 2,999,752 | 9/1961 | Webb ........................................ 99/2 |
| 3,244,527 | 4/1966 | Baker ........................................ 99/2 |
| 3,511,645 | 5/1970 | Goni ..................................... 75/101 |
| 3,658,510 | 4/1972 | Hoffmann et al. ....................... 75/99 |
| 3,961,933 | 6/1976 | Kuyama et al. ......................... 71/67 |
| 4,021,569 | 5/1977 | Abel-Monem ..................... 424/289 |
| 4,039,681 | 8/1977 | Abdel-Monem ..................... 424/289 |
| 4,075,326 | 2/1978 | Kuyama et al. ..................... 424/141 |
| 4,102,976 | 7/1978 | Hiemeleers et al. .................. 423/87 |
| 4,150,112 | 4/1979 | Wagenknecht et al. .............. 424/48 |
| 4,159,194 | 6/1979 | Steward ................................ 23/301 |
| 4,220,667 | 9/1980 | Jakinovich, Jr. ...................... 426/96 |
| 4,292,281 | 9/1981 | Chilcote et al. ....................... 423/27 |
| 4,629,625 | 12/1986 | Gaull .................................... 424/145 |
| 4,737,365 | 4/1988 | Meyer ...................................... 426/2 |
| 4,751,085 | 6/1988 | Gauil ................................... 424/145 |
| 4,948,594 | 8/1990 | Abdel-Monem et al. ............... 426/2 |
| 4,956,188 | 9/1990 | Anderson ............................... 426/74 |
| 5,114,592 | 5/1992 | Schuster et al. ..................... 210/667 |
| 5,118,444 | 6/1992 | Nguyen ............................... 252/390 |
| 5,122,279 | 6/1992 | Guess .................................. 210/717 |
| 5,160,753 | 11/1992 | Van Benthem et al. ................ 426/2 |
| 5,314,852 | 5/1994 | Klatte .................................... 502/60 |
| 5,451,414 | 9/1995 | Steward ................................ 426/74 |
| 5,534,043 | 7/1996 | Steward ................................. 71/32 |

OTHER PUBLICATIONS

Coelho, Michael, "Stability of Vitamins Affected by Feed Processing", *Mitt Feedstuff*, Jul. 29, 1996, pp. 9–14.

Shurson, Jerry, Salzer, Troy, and Koehler, Dean, "Metal-specific amino acid complexes, inorganic trace minerals effect on vitamin stability examined" *Feedstuffs*, p. 13.

*Primary Examiner*—Kevin E. Weddington
(74) *Attorney, Agent, or Firm*—Woodard, Emhardt, Naughton, Moriarty & McNett

(57) ABSTRACT

In general, this invention relates to a micronutrient supplement that can be used in food or in animal feeds and to a method of enhancing the growth of animals using the micronutrient. The micronutrient supplement includes a basic salt of an essential metal. The essential metal can be formulated as a pharmaceutically acceptable basic salt that includes a divalent or trivalent cation of an essential metal, a pharmaceutically acceptable anion and a hydroxyl moiety. Representative essential metals for use in this invention include: Magnesium, calcium, iron, manganese, zinc, copper, cobalt, iron and chromium. When provided as a metal salt, the essential metal is highly bioavailable to enhance the survivability, growth, health and/or reproductivity of animals. The micronutrient supplement can be administered to animals either as a single supplement or admixed with other nutrients or feeds.

21 Claims, 1 Drawing Sheet

VITAMIN COMPATIBLE MICRONUTRIENT SUPPLEMENT

CROSS-REFERENCE TO RELATED APPLICATION

The present application claims the benefit of United States Provisional Application Ser. No. 60/110,800 filed on Dec. 3, 1998, which is hereby incorporated by reference in its entirety.

FIELD OF THE INVENTION

This invention relates to a micronutrient supplement for food or animal feeds and a method of enhancing the survivability, growth, health and/or reproductivity of humans and other animals. More specifically, this invention is directed to a micronutrient supplement that includes a basic salt of an essential metal, which provides high bioavailability of the essential metal to humans and other animals, and to a method of enhancing the growth of humans and other animals by administering the micronutrient supplement either as a single supplement or admixed with other nutrients.

BACKGROUND OF THE INVENTION

Micronutrients include vitamins and some elements usually in the form of minerals or metal salts; most notably the elements include calcium, phosphorus, potassium, iron, zinc, copper, magnesium, manganese and iodine. Micronutrients are generally consumed in small amounts, i.e., less than 1 gm/day, usually absorbed unchanged, and many essential elements have catalytic functions. While the micronutrients are often present in minute amounts, their bioavailability is essential for survival, growth, health and reproduction. Micronutrients are important for children and other young animals, particularly during their early development years when they are rapidly growing. Furthermore, many new animal breeds require additional amounts of micronutrients as their abilities to grow at a faster rate while consuming less feed has improved. This intensive growth imposes greater metabolic stresses, causing increased susceptibility to vitamin deficiencies. It is well recognized that the needed micronutrients are often not found or not found in sufficient quantities in their food or feed sources, whether these sources are naturally occurring or commercially prepared. Consequently, virtually all industrial food and feed formulations are fortified with vitamins and minerals. The cost to commercial livestock producers for supplying micronutrients to their livestock herds can be staggering.

While human and animals' needs for additional nutrients have been well documented, the availability of the micronutrients has not always met their needs. It is not sufficient to simply increase amounts of the micronutrients in the food or feed sources. This method is ineffective, wasteful and unsafe. Many of the micronutrients are not readily absorbed; the added amounts of vitamins and minerals are simply excreted without being absorbed. Excess loading of vitamins and minerals is unsafe, and in certain circumstances, excess loading can be toxic, causing severe acute and chronic harm and even can be fatal. Thus, there is a need to provide an inexpensive, readily absorbed micronutrient to decrease costs, reduce waste and to help establish a more precise control of the nutritional requirement for humans and animals.

Most commercial processes combine several vitamins and minerals either in a pre-mixed feed supplement or in the feed mix itself. It is known that the vitamin stability can be directly correlated with the vitamin environment, moisture content, temperature, and method of feed processing. Typically pellitized feed products are prepared by mixing a raw feed source with feed supplements such as vitamins, the resulting raw feed mixture is processed with water (or steam) and heated to form a mash, which is forced through a pelletizing die. This process provides nearly optimum conditions (heat and moisture) to oxidatively degrade the included vitamins. Furthermore, the deterioration of vitamins admixed in a feed mix that have been exposed to light and heat has been well documented, especially when inorganic trace minerals also are intimately mixed with the vitamins. For example, it has been determined that multivitamin premixes containing inorganic trace minerals lose about 55% of their pyridoxine activity when stored at 98 ° F. for about 3 months. Conversely, a premix containing no trace minerals lost only about 24% of its pyridoxine activity under the same conditions. It has been postulated that certain metal salts adversely affect vitamin stability, possibly by promoting a redox reaction that oxidizes the vitamins, destroying their bioactivity. Loss of vitamin activity during storage of the premixes and other prepared nutrients may account for hidden depressions in growth, feed efficiency and disease resistance due to subclinical vitamin deficiencies. Thus, there is a need to provide a micronutrient supplement that is readily bioavailable, storage stable and compatible with a wide variety of different vitamins. The micronutrient supplement must also be cost-efficient to produce and provide a food source for humans and animals that will increase their survivability, growth, health and/or reproductivity.

SUMMARY OF THE INVENTION

The present invention relates to micronutrient food or feed supplements, and the manufacture and use thereof. Various aspects of the invention are novel, nonobvious, and provide various advantages. While the actual nature of the invention covered herein can only be determined with reference to the claims appended hereto, certain forms and features, which are characteristic of the preferred embodiments disclosed herein, are described briefly as follows.

Thus, there is provided in the present invention a micronutrient food or feed supplement that comprises a salt of an essential metal. The essential metal can be formulated as a pharmaceutically acceptable basic salt of the formula that includes a divalent or trivalent cation of an essential metal, a pharmaceutically acceptable anion and a hydroxyl moiety. In one preferred embodiment of the present invention, a micronutrient supplement comprising a basic salt of the formula $Zn(OH)_y(SO_4)_{(2-y)/2}$ or $Zn(OH)_yCl_{(2-y)}$ is provided wherein y is selected to be greater than 0 but less than about 2. The essential metals formulated as the pharmaceutically acceptable salts of the above formula are readily absorbed by animals.

The present invention also provides a method of enhancing the growth of humans and other animals by providing a micronutrient supplement that comprises a basic metal salt of an essential metal cation and a pharmaceutically acceptable anion. The micronutrient supplement can be administered directly or it can be admixed with vitamins and other micronutrients to provide a supplemental premix that may be administered to humans or animals. Alternatively, the supplemental premix can be combined with a food or animal feed. In a preferred form, the micronutrient supplement, the premix and/or the food or animal feed may be stored for extended periods of time without significant deterioration of the bioactivity of the basic metal salt, the vitamins and other nutrients. When the micronutrient supplement is provided to humans or other animals in a physiologically effective amount, their survivability, growth rate, health and/or reproductivity increases.

There is also provided in the present invention a method of enhancing vitamin stability in a feed composition that contains at least one inorganic mineral. The method comprises providing as the inorganic mineral a basic salt of an essential metal. The basic salt is admixed with at least one vitamin and optionally other nutrients to provide a premixed nutrient composition or feed. The premixed nutrient composition or feed can be stored for an extended period of time without significant loss of the bioactivity of the included vitamin(s).

It is one object of the present invention to provide a micronutrient supplement.

Further objects, features, aspects, forms, advantages and benefits shall become apparent from the description and drawings contained herein.

DETAILED DESCRIPTION OF THE INVENTION

Figure 1:
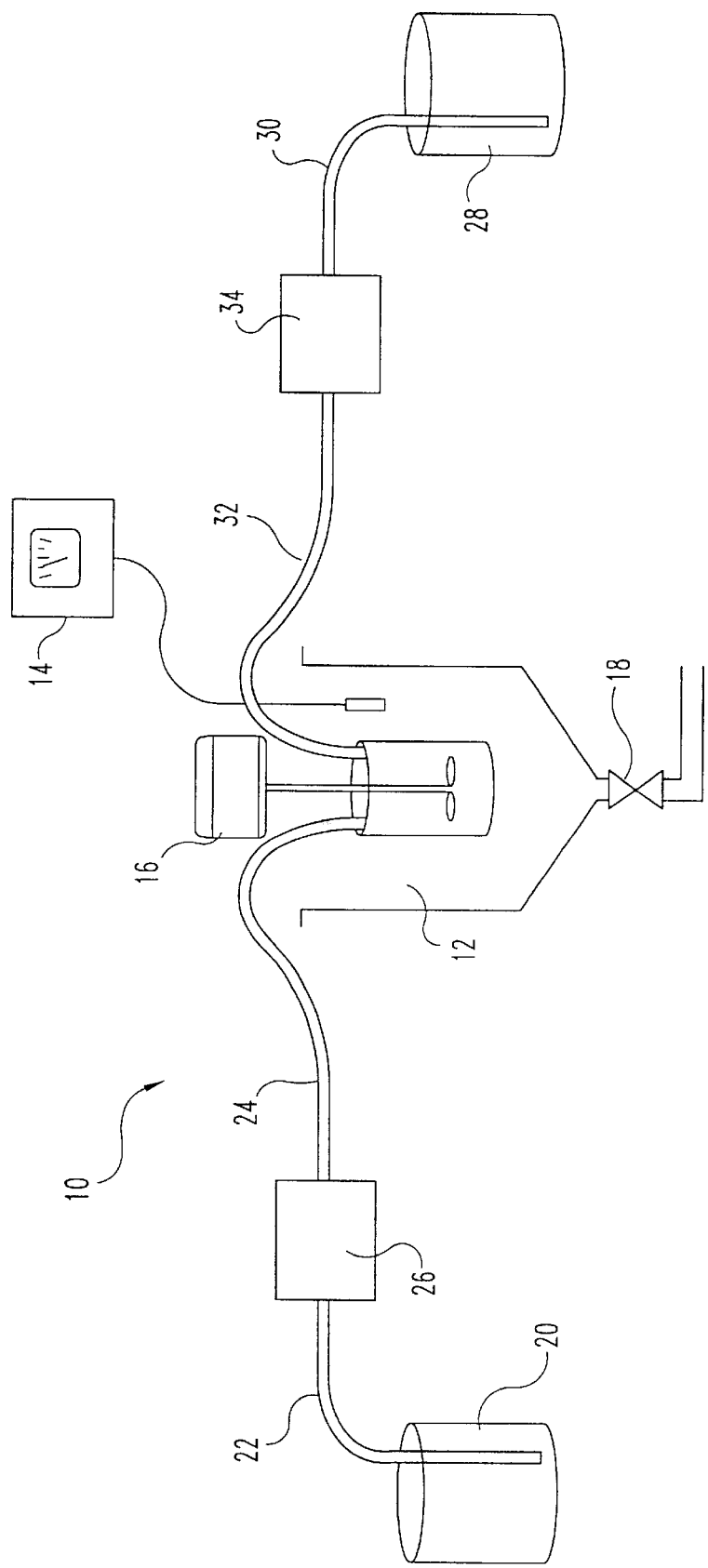
FIG. 1 is schematic illustrating reactor useful to prepare basic metal salts for use in the present invention.

Generally, this invention provides a micronutrient supplement that can be administered directly to humans or animals as a solid, a suspension or an admixture containing other nutrients such as vitamins, minerals, and food or animal feeds to enhance the survivability, growth, health and/or reproductivity of humans and animals. The basic salt in the micronutrient supplement includes a divalent or trivalent cation of an essential metal, a pharmaceutically acceptable anion, and a hydroxyl moiety. The micronutrient supplement of the present invention provides good bioavailability of the essential metal in that it is readily absorbed or taken up in a biologically-effective amount. The micronutrient can be combined with other nutrients, particularly vitamins, to provide a premixed supplement. The premixed supplement that includes the basic salts according to the present invention can be processed with heat and moisture and then stored for an extended period of time without significant decrease in the bioactivity of the included vitamin(s).

An essential metal is defined for the purposes of this invention as a pharmaceutically acceptable metal whose uptake by humans or other animals in a biologically effective amount increases their survivability, growth, health and/or reproductivity. The mode of action of the essential metal is not critical for the present invention. For example, the essential metal can act as a co-factor or a catalyst in a metalloenzyme or metalloprotein; it can be adsorbed by a variety of tissues. Alternatively, the essential metal or a metabolite thereof can inhibit growth of bacteria, or other pathogens detrimental to the survivability, growth, health and/or reproductivity of the animal.

In one embodiment of the present invention, the basic metal salt includes a divalent metal cation, M, a hydroxyl moiety and an anion or anionic complex X. When the basic metal salt of this embodiment of the invention includes a monovalent anion, the basic salt includes a compound of the formula $M(OH)_y X_{(2-y)}$. When the basic salt includes a divalent anion, the basic metal salt includes a compound of the formula $M(OH)_y X_{(2-y)/2}$. And when the basic salt includes a trivalent anion, the basic metal salt includes a compound of the formula $M(OH)_y X_{(2-y)/3}$. In the formulae listed above, preferably M is selected from the group of metal dications that include magnesium, calcium, iron, manganese, zinc, copper, and cobalt, X is a pharmaceutically acceptable anion or anionic complex and y is selected to be a real number greater than 0 but less than 2. In certain embodiments, y can be selected as a non-integer.

In an alternative embodiment of the present invention, the basic metal salt includes a trivalent metal cation, M', a hydroxyl moiety and an anion or anionic complex X. When the basic metal salt of this embodiment of the invention includes a monovalent anion, the basic metal salt includes a compound of the formula $M'(OH)_u X_{(3-u)}$. When the basic salt includes a divalent anion, the basic metal salt includes a compound of the formula $M'(OH)_u X_{(3-u)/2}$. And when the basic salt includes a trivalent anion, the basic metal salt includes a compound of the formula $M'(OH)_u X_{(3-u)/3}$. In the formulae listed above, preferably M' is selected from the group of metal trications that includes cobalt, iron and chromium, X is a pharmaceutically acceptable anion or anionic complex and u is selected to be a real number greater than 0 but less than 3. In certain embodiments, u can be selected as a non-integer.

In the microstructure that makes up the basic salt, the metal cation includes a hydroxyl moiety in its coordination sphere. Thus, within a homologous series of compounds wherein the identity of M (or M') and X remain constant, the hydroxyl moiety does not have to be included in precise stoichiometric units. In these series, y is greater than about 0 but less than 2 (or for M', u is greater than 0 but less than 3). In specific embodiments for a divalent cation of an essential metal, M, it is more preferable that y be greater than about 1.0 but less than or equal to about 1.5. The values of u and y may be dependent upon the experimental conditions used to prepare the basic salt. For example, u or y may be dependent upon the pH at which the salt is prepared; alternatively, u or y may be dependent upon the concentration of the pharmaceutically acceptable anion, X, present in the reaction medium. It is understood that varying the value of y from greater than 0 to less than about 2 (for M', u from greater than 0 to less than 3) influences the solubility, bioavailability, nutritional value and enhanced vitamin stability of the micronutrient supplement.

The anion, X, for the basic metal salt is a pharmaceutically acceptable anion. Pharmaceutically acceptable anions are well known in the art. See, for example, S. M. Berge et al. *J. Pharmaceutical Sciences*, 66:1–19, 1977 for a listing of pharmaceutically acceptable anions, which is incorporated herein by reference. Examples of pharmaceutically acceptable anions include, but are not limited to: halide, carbonate, bicarbonate, sulfate, sulfite, bisulfate, bisulfite, phosphate, monohydrogen phosphate, dihydrogen phosphate, metaphosphate, pyrophosphate, nitrate and nitrite. Frequently the anions are derived from partially neutralized inorganic acids. Examples of inorganic acids useful for the present invention include HCl, HBr, HI, $H_2SO_4$, $H_3PO_4$, $H_4P_2O_7$, $HNO_2$ and $HNO_3$. The basic metal salts generally have pH in water between about pH 1.9 and about pH 8.0. Generally, there is a correlation between the pH and the species of basic metal salt formed, although this may vary somewhat depending upon the ionic matrix from which the compounds were formed. A plethora of basic salts can be prepared for a homologous series of compounds having the same cationic essential metal and pharmaceutically acceptable anion. These basic metal salts can be distinguished from each other by the ratio of the hydroxyl moiety to the pharmaceutically acceptable anion, X, in the basic salt.

Certain of the anions that are useful for the present invention impart significant biological effects in their own right. Specific examples of biologically significant anions include, but are not restricted to: iodide, chloride, and phosphate (phosphorus). These biologically significant anions can also be considered as micronutrients for use in the basic salt of the present invention. Thus, it is within the scope of the present invention to provide basic salts of essential elements that may not necessarily be considered metals such as iodine and chloride. These essential elements are also provided in the basic salt in accordance with this invention.

The basic metal salts are generally water insoluble, but their solubility can depend upon pH. Typically, the basic metal salts have some solubility at a low pH, i.e., pH less than about 2.0 to about 0.1. In addition, certain basic metal salts dissolve in water at a high pH, typically at a pH greater than about 7.5 or 8 to about 11.

The basic salts can be prepared from known minerals or inorganic salts. Typically, the mineral or known salt is dissolved in water, for example, the water soluble salt of an essential metal. Examples of water soluble salts useful for the present invention include, but are not limited to: $ZnCl_2$, $ZnSO_4$, $MnCl_2$, $Fe(NO_3)_2$, $FeCl_2$, $FeSO_4$, $Co(NO_3)_2$ and $CoI_2$. After dissolution of the salt, the pH of the medium is adjusted to between about 7.5 and about 2. Generally, the basic metal salt begins to precipitate out of the reaction medium once a certain pH range is reached. The optimum pH at which the basic metal salt precipitates readily can be determined. At this optimum pH the yield of the basic metal salt is maximized. In addition to raising the pH to isolate the basic metal salts, use of techniques well known in the art to induce precipitation may be employed. (See U.S. Pat. No. 5,534,043 to Steward, which is incorporated herein by reference.) For example, a co-solvent may be used to induce or complete precipitation of the basic metal salt. Typical co-solvents could include alcohols, acetone, dioxanes, glycols and any other water miscible co-solvents that do not inhibit the formation of the basic metal salt. A common ion may be added to induce precipitation. However, addition of a common ion can influence the amount of hydroxide included in the basic salt. The volume of the reaction mixture can be reduced by evaporation or distillation, which could include heat and/or reduced pressure. Cooling the reaction mixture can be used to complete the isolation of the basic metal salt of the reaction mixture. In some specific applications where the water soluble salts are sufficiently pure, essentially all the reaction medium can be removed by evaporation, distillation or freeze drying to isolate the basic metal salt from the reaction medium.

A representative example of a laboratory bench-scale reactor for use with the present invention is depicted in FIG. 1, which is useful for small-scale preparations of basic salts. Bench-scale reactor 10 includes reactor vessel 12, which can be a bench-scale draft tube crystallizer. Reactor vessel 12 includes pH meter 14, overhead stirrer 16 and solid product outlet 18. An acidic solution of a metal is stored in reservoir 20; the acidic solution is transferred to reactor vessel 12 through tubes 22, 24 and metering pump 26. A basic solution, preferably an ammonium hydroxide solution, is stored in reservoir 28 and transferred to reactor vessel 12 through tubes 30, 32 and metering pump 34.

Reactor vessel 12 is filled with either water or an appropriate salt solution. An acidic solution of a metal such as zinc sulfate ($ZnSO_4$) is stored in acidic reservoir 20 and then slowly transferred through tubes 22 and 24 using a positive displacement metering pump 26 (such as a peristaltic pump) into reactor vessel 12. A basic solution such as an ammonium hydroxide solution, which is stored in reservoir 28, is simultaneously introduced into reactor vessel 12 through tubes 30 and 32 using metering pump 34. The pH of the reaction mixture, comprising the acid metal solution and the basic solution inside reactor vessel 12, is carefully monitored using pH meter 14. Preferably, the pH of the reaction mixture is maintained between about 2 and about 7.5 or 8 depending upon the basic metal salt. The pH of the reaction mixture can be adjusted by adjusting the rate of addition of the basic solution. Increasing the basic solution flow rate increases the pH level of the reaction mixture. Alternatively, reducing the basic solution flow rate decreases the pH level of the reaction mixture. The basic metal salt begins to precipitate out of solution almost immediately. The salt is withdrawn from the reaction mixture through product outlet 18.

While the yield of the basic metal salt can be optimized by manipulating the pH, temperature, inclusion of co-solvents, and/or solvent volume, the basic metal salt species produced by maximizing the isolated yield may not necessarily be the most preferred basic salt species for use in the micronutrient supplement. The optimum micronutrient supplement includes the basic salt species that achieves the best growth rate, feed utilization and health (including immune competency), and provides adequate body reserves.

Once the basic metal salt has been isolated from the reaction medium, it can be size reduced or agglomerated to provide appropriately sized particles suitable for admixing with other nutrients and for feed processing. It is important to provide the basic metal salt as a suitably sized particle that can be readily incorporated into existing feed processing procedures and equipment, yet sufficiently fine to provide uniform blending with other nutrients and, thus, enhance absorption by animals. In one specific embodiment, the basic metal salt is provided in a particle size of about 30 microns to about 300 microns, more preferably about 50 to about 100 microns.

Many of the basic salts prepared according to the present invention are highly water insoluble. Despite this insolubility, the micronutrient supplements are readily absorbed and incorporated into animal tissues. For example, micronutrient supplements containing $Zn(OH)_y Cl_{2-y}$ and/or $Zn(OH)_y(SO_4)_{(2-y)2}$, wherein y is greater than about 1.0 and less than about 1.5, are readily absorbed by chicks when the supplement is included in their feed. The chicks absorb the zinc in the basic zinc salts as readily as other sources of zinc, including the water soluble zinc species.

The micronutrient supplement can be admixed with other nutrients. Nutrients include both micro- and macronutrients. Examples of micronutrients include vitamins and minerals. Examples of vitamins useful for the present invention include: vitamin A, vitamin $D_3$, vitamin E (tocopherol), vitamin K (menadione), vitamin $B_{12}$ (cyanocobalamin), vitamin $B_6$, vitamin $B_1$, vitamin C (ascorbic acid), niacin, riboflavin, thiamine mononitrate, folic acid, calcium pentothenate, pyridoxine, choline chloride, biotin, known pharmaceutically acceptable derivatives of these vitamins and mixtures thereof. Examples of minerals or metal salts useful for the present invention include copper sulfate, iron sulfate, zinc oxide, manganese, iodine, selenium, amino acid complexes of the trace metals and mixtures thereof. The macronutrients that can be used in the present invention include any of the common feed ingredients such as, for example, grain, seeds, grasses, meat meal, fish meal, fats and oils.

The micronutrient supplement of the present invention can be formulated as a solid tablet, suspension, nutrient premix, or feed composition. The micronutrient supplement can be combined with pharmaceutically acceptable carriers. Examples of acceptable carriers include non-toxic, inert solid, semi-solid or liquid filler, diluent, encapsulating material or formulation auxiliary of any type. Some examples of the materials that can serve as pharmaceutically acceptable carriers are sugars, such as lactose, glucose, and sucrose; starches such as corn starch, and potato starch; cellulose and its derivatives such as sodium carboxymethyl cellulose, ethyl cellulose, and cellulose acetate; powdered tragacanth; malt; gelatin; talc, calcite grits, excipients such as cocoa butter and suppository waxes; fats from animals or vegetables; oils such as peanut oil, cottonseed oil, safflower oil, sesame seed oil, olive oil, corn oil, soybean oil and mineral oil; polyols such as glycol, glycerin, sorbitol, mannitol and polyethylene glycol; buffering agents such as magnesium hydroxide and aluminum hydroxide; alginic acid; water; isotonic saline; ethyl alcohol and phosphate buffer solutions, as well as other non-toxic compatible substances used in pharmaceutical formulations. The micronutrient supplement can include emulsifiers and lubricants such as sodium lauryl sulfate and magnesium stearate, as well as coloring agents, releasing agents, coating agents; flavorants such as sweeteners, corn syrup, sugars, and other known flavoring agents. Preservatives and antioxidants can also be present in the supplement. Examples of acceptable antioxidants include water soluble antioxidants such as ascorbic acid, cysteine hydrochloride, sodium bisulfite, sodium metabisulfite, sodium sulfite and santoquin; oil soluble antioxidants such as ascorbyl palmitate butylated hydroxyanisole, (BHA), butylated hydroxytoluene (BHT), lecithin, propylgallate, alpha-tocopherol and ethoxyquin; metal chelating agents such as citric acid, ethylenediamine tetraacetic acid (EDTA), sorbitol, tartaric acid and phosphoric acid.

The basic metal salts of this invention can be used to enhance the survivability, growth rate, health and/or reproductivity in humans and other animals. While not to be bound by any theory, it is thought that the basic metal salts are more readily absorbed and/or exhibit an increased bioavailability over minerals, inorganic metal salts or other nutrients containing the corresponding essential metals. It has unexpectedly been determined the preferred embodiments of the basic metal salts of this invention significantly reduce the growth of bacteria, thus indicating the use of preferred forms of this invention can effectively enhance the growth and health of humans and other animals. Furthermore, the preferred basic metal salts of this invention demonstrate an enhanced efficacy against certain bacteria, thereby allowing for the use of smaller amounts and/or lower concentrations of the essential metals to provide substantially equal or equal potent effects on animals.

It has been demonstrated that vitamin stability is adversely affected by feed processing methods, contact and/or storage with minerals and inorganic metal salts. Use of the basic metal salts of the present invention as a micronutrient pre-mixed feed additive enhances the stability of certain nutrients, such as vitamins. Furthermore, use of basic metal salts according to this invention can reduce the necessity of including preservatives and/or antioxidants in food animal feed mixes. While it is not intended that the present invention be limited by any theory, it is believed that the basic metal salts of the present invention have a low redox potential and a low water solubility. Thus, the basic metal salts do not readily promote or induce loss of vitamin activity when provided as a pre-mixed additive.

For the purpose of promoting further understanding and appreciation of the present invention and its advantages, the following Examples are provided. It will be understood, however, that these Examples are illustrative and not limiting in any fashion.

EXAMPLE 1

The bioavailability of basic zinc sulfate and basic zinc chloride was compared with that of feed grade zinc oxide using reagent grade zinc sulfate heptahydrate as the standard. The basal diet containing 117 ppm zinc (dry matter basis by analysis) was formulated to meet the requirements of starting chicks (See Table 1; Nutrient Requirements of Poultry, $9^{th}$ edn. National Academy Press, Washington, D.C. 1994). The reagent grade zinc sulfate, basic zinc sulfate and basic zinc chloride were added to a basal diet at 200 or 400 ppm zinc and the feed grade zinc oxide was added at 400 ppm zinc. Chicks were fed the respective basal diets for 21 days. There were six pens each containing six chicks (three male and three female) for each of eight dietary treatments, for a total of 288 birds. Chicks were housed in two Petersime brooder units with stainless steel fittings and maintained on a 24-hour constant light schedule. Tap water containing no detectable zinc and feed were available ad libitum. Feed intake was recorded per pen. At the end of the experiment, birds were weighed individually, killed by cervical dislocation, and right tibia removed and frozen individually for zinc analysis.

CHEMICAL ANALYSIS

Zinc concentrations in basal diet, water, zinc sources, and tibias were determined by flame atomic absorption spectrophotometry (Model 5000 with an AS-50 autosampler, Perkin-Elmer, Norwalk Conn. 06859-0156, Anonymous, 1982. Analytical Methods for Atomic Absorption Spectrophotometry. Perkin-Elmer Corp., Norwalk, Conn.). Diet samples were dried at 105° C. for 12 hours, then were dry ashed at 550° C. for 12 hours, solubilized in HCl, and filtered through 42 Whatman paper. Bones were boiled for approximately 10 minutes in deionized water and cleaned of all soft tissue. Tibias with associated cartilages were dried for 12 hours at 105° C., extracted in a Soxhlet apparatus with petroleum ether for 48 hours prior to ashing, and then solubilized as indicated above. Water was concentrated 10-fold by evaporation on a hotplate. Zinc sources were refluxed for 4 hours in 1:1 (v:v) concentrated $HCl—HNO_3$ and filtered through 42 Whatman paper. Standards were matched for macroelement and acid concentrations as needed.

Solubility of 0.1 g of the zinc sources was determined in 100 ml of $H_2O$, 0.4% HCl, 2% citric acid, or neutral ammonium citrate after 1 hour of constant stirring at 37° C. (Watson, L. T., C. B. Ammerman, S. M. Miller, and R. H. Harms, Biological Assay of Inorganic Manganese for Chicks, Poultry Sci. 1970, 49: 1548–1554).

STATISTICAL ANALYSIS

Data were analyzed by two-way ANOVA with a model that included zinc source, dietary zinc concentration, and their interaction. Each of the six pens were used as experimental units. Body weight, feed intake, and percentage of bone ash were also analyzed by the General Linear Models (GLM) (SAS Institute, 1990. SAS/STAT User's Guide (Release 6.04) SAS Institute Inc., Cary, N.C.) with an LSMEANS statement and PDIFF option to compare treatment means. Multiple linear regression of bone zinc concentration on added dietary zinc concentration was calculated using GLM. Relative bioavailability estimates were calculated using slope ratios.

RESULTS

There was no effect (P>0.10) of zinc source or dietary zinc concentration on feed intake, body weight, or percentage of bone ash in chicks fed 3 weeks (See Tables 2). The nonsignificant decrease in feed intake observed has been reported previously in chicks supplemented with elevated concentrations of highly available zinc sources (Sandoval, M. P. R. Henry, C. B. Ammerman, R. D. Miles, and R. C. Littell. 1997 Relative bioavailablilty of supplemental zinc sources for chicks. J. Amin. Sci. 75:3195–3205). The effect of zinc source (P=0.0002) on bone zinc concentration was due to supplementation from any source compared with the control diet rather than a difference among sources.

Relative bioavailability values estimated from multiple linear regression slope ratios of bone zinc concentration (ppm ash weight basis) on added dietary zinc concentration (ppm) are found in Table 3. Although the regression model was significant (P=0.001), the coefficient of determination indicated considerable lack of fit to the linear model ($R^2$= 0.34). The response for the standard source, reagent grade zinc sulfate was set at 100%. Calculated values were: basic zinc sulfate 100.6±9.1, basic zinc chloride 106.7±9.54, and zinc oxide 49.0±10.1%. The value for the oxide was lower (P<0.05) than that for other sources, as indicated by the 95% fiducial limits.

The basic zinc sulfate and chloride forms were both insoluble in water, but completely soluble in 0.4% HCl, 2% citric acid, and neutral ammonium sulfate (See Table 4). Similar values for reagent grade zinc sulfate and feed grade zinc oxide were reported recently by Sandoval el al. (1997). Reagent grade zinc sulfate was 100% soluble in all solvents. A sample of feed grade zinc oxide similar to that used in the present study was insoluble in water, but had values of 99, 69, and 53 for HCl, citric acid, and neutral ammonium citrate, respectively.

CONCLUSION

The bioavailability of zinc in basic zinc sulfate and basic zinc chloride was equal to that of reagent grade zinc sulfate for chicks. Both of these sources of zinc are good supplemental sources of the element for inclusion in diets for livestock and poultry.

TABLE 1

Composition of Basal Diet[a]

| Ingredient | Amount wt % |
| --- | --- |
| Ground yellow | 55.42 |
| Soybean meal (48% CP) | 37.20 |
| Corn oil | 2.50 |
| Iodized salt | 0.40 |
| DL-methionine | 0.25 |
| Ground limestone | 1.01 |
| Dicalcium phosphate | 1.72 |
| Microingredients[c] | 0.50 |
| Cornstarch + Zn[d] | 1.00 |

[a]Dry matter was 91.3% and Zn concentration was 117 ppm.
[b]As-fed basis.
[c]Ingredients supplied per kilogram of diet: vitamin A palmitate, 6,600 IU; cholecalciferol, 2,200 ICU; menadione dimethylpyrimidinol bisulfite, 2.2 mg; riboflavin, 4.4 mg; pantothenic acid, 13 mg; niacin, 40 mg; choline chloride, 500 mg; biotin, 1 mg; vitamin $B_{12}$, 22 ig; ethoxyquin, 125 mg; iron, 50 mg; copper, 6 mg; zinc, 40 mg; manganese, 60 mg; selenium, .2 mg.
[d]Zinc supplements added in place of equivalent weights of cornstarch.

TABLE 2

Effect of Source and Level of Dietary Zinc on Performance and Bone Characteristics of Chicks Fed 3 Weeks

| Zn Source[a] | Added Zn, ppm[b] | Feed Intake g/bird | Body Weight g | Bone Zn, ppm | Bone Ash (ash wt %) |
| --- | --- | --- | --- | --- | --- |
| Control | 0 | 753 | 624 | 357 | 45.0 |
| Sulfate RG | 200 | 710 | 574 | 402 | 44.2 |
| Sulfate, RG | 400 | 679 | 559 | 414 | 42.8 |
| Sulfate basic | 200 | 690 | 585 | 398 | 44.4 |
| Sulfate basic | 400 | 708 | 599 | 416 | 44.5 |
| Chloride, basic | 200 | 724 | 592 | 411 | 45.1 |
| Chloride, basic | 400 | 652 | 563 | 413 | 43.6 |
| Oxide | 400 | 709 | 588 | 393 | 44.4 |
| Pooled SE | | 10.4 | 8.6 | 3.3 | 0.23 |
| ANOVA | | | Probability | | |
| Source (S) | | 0.4788 | 0.4009 | 0.0002 | 0.3633 |
| Level (L) | | 0.2467 | 0.5947 | 0.1510 | 0.0805 |
| –S*L | | –0.3179 | 0.6603 | 0.6882 | 0.3607 |
| $R^2$ | | 0.15 | 0.11 | 0.43 | 0.20 |

[a]RG is reagent grade
[b]Control diet contained 117 ppm Zn (DM basis)

TABLE 3

Multiple Linear Regression of Bone Zinc Concentration (ppm ash weight) on Added Dietary Zinc Concentration ppm)[a]

| Zn Source | Slope ± SE | Relative value ± SE | 95% Confidence Interval |
| --- | --- | --- | --- |
| Sulfate, RG | 0.1193 ± 0.0316 | 100 | — |
| Sulfate, basic | 0.1200 ± 0.0316 | 100.6 ± 9.10 | 82.3–119 |
| Chloride, basic | 0.1273 ± 0.0316 | 106.7 ± 9.54 | 87.5–126 |
| Oxide, feed grade | 0.0584 ± 0.0309 | 49.0 ± 10.1 | 28.7–69.2 |

[a]Intercept = 370; $R^2$ = .34; Standard deviation = 23.8.

TABLE 4

Solubility of Basic Zinc Sulfate and Basic Zinc Chloride[a]

| Zn Source | Zn % | Water | 0.4% HCl | 2% Citric acid | Neutral ammonium citrate |
| --- | --- | --- | --- | --- | --- |
| Sulfate, basic | 49.1 | <1.0 | 100 | 100 | 100 |
| Chloride, basic | 54.8 | 2.6 | 100 | 100 | 100 |

[a]From 1 hour constant stirring at 37° C. expressed as a percentage of total zinc.

EXAMPLE 2

Effect of a Basic Mineral Premix on in Vitro and inVivo Feed and Blood Vitamin Activity Broiler chick starter diets were formulated and then pelleted using two different types of mineral premix to evaluate their effects on vitamin stability through the pelleting process. They were then fed to chicks to evaluate animal performance and relative levels of vitamins actually reaching the birds. The base diet was a conventional corn/soy-based starter diet with each of the mineral premixes added at 1.5 pounds/ton of complete feed. Each premix was formulated to provide essential trace elements at the following levels in the complete diet:

| Element | Concentration (ppm) |
| --- | --- |
| Manganese | 120 |
| Zinc | 100 |
| Iron | 40 |
| Copper | 10 |
| Iodine | 1.25 |

One mineral premix was an industry-standard, sulfate-based mix where the manganese, zinc, iron and copper were each provided from their respective sulfate salts. The other premix was formulated with neutral salts of each element to eliminate the acidic, sulfate salts entirely. Manganese was supplied by manganous oxide, zinc by tri-basic zinc chloride, iron by ferrous carbonate and copper by tri-basic copper chloride. The premixes contained enough calcium carbonate to standardize the mixes so 1.5 pounds of each provided the correct level of essential mineral elements.

Ross x Cobb chicks were randomly assigned into one of two test groups. Each test group contained 80 chicks randomly assigned into eight replicates; each replicate contained 10 chicks. The chicks in the first test group were fed the diet containing the sulfate mineral premix, while the second test group received the diet containing the neutral mineral premix.

The evaluation of the differences in the premixes was started on Day 0 (the day the chickens hatched). Chicks were not replaced during the course of the trial. The chicks were observed daily for signs of unusual growout patterns or health problems. Body weights and food consumption were measured on trial day 21. On day 21 blood samples were collected from each chick within a cage and pooled by mixing equal aliquots to make a cage sample which was analyzed for Vitamin E. Also, on day 21, the birds were sacrificed by cervical dislocation and the livers removed for Vitamin E analyses. The results of the trial are listed in Table 5.

TABLE 5

The Comparison of a Mineral Premix and a Basic Mineral Premix on In Vitro and In Vivo Feed and Blood Vitamin Activity.

| | Mineral Premix | |
| --- | --- | --- |
| Test Parameter | Standard Sulfate Mineral Premix[a] | Neutral Mineral Premix |
| Mean Body Weight (Kg) | 0.599 | 0.608 |
| Feed Conversion | 1.421 | 1.416 |
| Mortality (%) Days 0–21 | 3.125 | 2.500 |
| Feed Vitamin E (IU/kg) | 12.253 | 12.510 |
| Blood Vitamin E ($\mu$g/dl) | 10.478 | 10.630 |
| Liver Vitamin E ($\mu$g/g) | 12.81 | 13.13 |

From the data listed in Table 5 it can readily be determined that the basic mineral premix out performs the commercial mineral premix in all parameters evaluated. Further, the test substantiates that use of a basic mineral salt reduces degradation of vitamins over that observed for the commonly used minerals.

EXAMPLE 3

Effect of Xinc Compounds on Bacteria

Zinc compounds, particularly zinc oxide, are used as a growth promotant usually for young animals. Typically a growth promotant is added to the young animal's diet at very high doses. For example, a growth promotant containing zinc oxide is frequently added to the diet of piglets at about 2,000 ppm, which is over 20 times the amount of zinc oxide commonly used for more mature pigs. It is thought that the added zinc oxide controls the microbial fauna in the piglet's digestive track. By controlling the amount of bacterial, the piglet's growth rate and chances of survival can be significantly enhanced. To help provide some insight on the use of zinc compounds as a growth promotant, the effect of certain zinc compounds was investigated on selected bacteria.

A series of 42 test tubes were filled with 7 ml of distilled water, and the pH of the water was adjusted to a pH of 7. Fourteen tubes were selected, and 1 ml of an aqueous stock solution containing DMV (DelMarVa-Delaware, Maryland, Virginia source) strain of E. coli was added to each of the 14 tubes. A second set of 14 tubes was selected. To each tube in this second set was added 1 ml stock solution containing a DMV strain of salmonella. A third set of 14 tubes was then selected, and to each these tubes was added 1 ml of a stock solution containing a DMV strain of camplobacter.

Two tubes from each of the three sets served as controls, and no zinc compounds were added to these controls. To each of the remaining tubes in the three sets was added either an aqueous solution of zinc oxide or tribasic zinc chloride (TBZC) in an amount sufficient to provide a final concentration of 500, 1,000 or 2,000 ppm of zinc, respectively. The pH of half of the tubes from each set was adjusted to a pH of 2 by the addition of concentrated HCl; the pH of the other half of the tubes was maintained at a pH of 7. Sufficient water was added to each tube to provide a final volume of 10 ml. All the tubes were placed in an incubator that was maintained at 37° C. for three hours.

After three hours, 0.20 ml was taken from each of the tubes, of which 0.1 ml was used to inoculate a MacConley Ager plate and 0.1 ml was used to inoculate a Blood Ager plate. The inoculated plates were air dried for 30 mins. then placed upside down in an incubator maintained at 37° C. for 24 hours. After 24 hours, each late was examined and the number of colonies on each plate was evaluated. The results are tabulated in Table 6.

TABLE 6

Effect of Zinc Compounds on Bacteria

| Tube | Zinc | Bacterial Source and Level (total per tube) | | | |
| --- | --- | --- | --- | --- | --- |
| Number | Zinc Source | Level (ppm) | pH | E. coli | Salmonella | Camplobacter |
| 1 | Control (no Zn additive) | 0 | 2 | >2000 col[b] | >1500 col[b] | >500 col[b] |
| 2 | Zinc oxide | 500 | 2 | >1500 <1600 col | >1000 <1100 col | >400 <500 col |
| 3 | Zinc oxide | 1000 | 2 | >1600 <1700 col | >1400 <1500 col | >300 <400 col |
| 4 | Zinc oxide | 2000 | 2 | >500 <600 col | >800 <900 col | >300 <400 col |
| 5 | TBZC | 500 | 2 | >300 <400 col | >800 <900 col | >300 <400 col |
| 6 | TBZC | 1000 | 2 | >200 <300 col | >500 <600 col | >300 <400 col |
| 7 | TBZC | 2000 | 2 | >50 <100 col | >400 <500 col | >200 <300 col |
| 8 | Control (no Zn additive) | 0 | 7 | >2000 col[b] | >1500 col | >500 col |

TABLE 6-continued

Effect of Zinc Compounds on Bacteria

| Tube Number | Zinc Source | Zinc Level (ppm) | pH | Bacterial Source and Level (total per tube) | | |
|---|---|---|---|---|---|---|
| | | | | E. coli | Salmonella | Camplobacter |
| 9 | Zinc oxide | 500 | 7 | >1200 <1300 col | >1400 <1500 col | >300 <400 col |
| 10 | Zinc oxide | 1000 | 7 | >1400 <1500 col | >1200 <1300 col | >400 <500 col |
| 11 | Zinc oxide | 2000 | 7 | >800 <900 col | >1000 <1100 col | >100 <200 col |
| 12 | TBZC | 500 | 7 | >500 <600 col | >600 <700 col | >100 <200 col |
| 13 | TBZC | 1000 | 7 | >400 <500 col | >600 <700 col | >200 <300 col |
| 14 | TBZC | 2000 | 7 | >50 <100 col | >100 <200 col | >50 <100 col |

<sup>a</sup>TBZC = tribasic zinc chloride
<sup>b</sup>Col. = colony forming units As can readily be determined from the results listed in Table 6 above, tribasic zinc chloride significantly reduced the growth rate of each of the bacteria tested.

EXAMPLE 4

Preparation of Tribasic Zinc Sulfate

Tribasic zinc sulfate can be prepared in a reaction system depicted in FIG. 1. Initially the reactor vessel contained 100 ml of dionized water. An acidic solution of zinc sulfate (120 g Zn/l, <pH 1.0) was added to the reactor vessel at a flow rate of about 5 ml per minute. The pH of the acidic zinc sulfate solution was raised using a basic ammonium hydroxide solution (26% $NH_3$), which was simultaneously added to the reactor vessel at a rate sufficient to maintain a pH of about 6.4 in the reactor vessel. Soon after the zinc sulfate and ammonium hydroxide solutions were added to the reactor vessel, a white precipitate formed. The white solid was allowed to settle out and withdrawn from the reactor vessel to yield about 83.3% yield tribasic zinc sulfate. The tribasic zinc sulfate had a water solubility of about 15 mg zinc per liter and a hygroscopicity when stored in 90% humidity for 140 hr. of about 4.65% weight gain verses a 36.1% weight gain for reagent grade zinc sulfate heptahydrate.

EXAMPLE 5

Preparation of Tribasic Copper Sulfate

Tribasic copper sulfate was prepared according to the procedure described in Example 4. Initially the reactor vessel contained 100 ml of an aqueous solution of ammonium sulfate (400 g/l). An aqueous, acidic solution of copper sulfate (40 g Cu/l, pH 1.0) was added to the reactor vessel at a flow rate of 5 ml/min. and admixed with an aqueous solution of ammonium hydroxide (13% $NH_3$), which was added at a flow rate sufficient to maintain a reaction pH of about 5.0. The tribasic copper sulfate immediately precipitated from solution as a pale, blue-green solid. The solid was collected and dried to provide a 71.4% yield of tribasic copper sulfate. The tribasic copper sulfate had a water solubility of about 430 mg Cu per liter and a hydroscopicity when stored in 90% humidity for 140 hr. of about 1.73% weight gain verses a 14.4% weight gain for reagent grade copper sulfate pentahydrate.

EXAMPLE 6

Perparation of Tribasic Zinc Chloride

Tribasic zinc chloride was prepared in a procedure as described in Example 4 Initially the reactor vessel contained 100 ml of dionized water. An aqueous, acidic solution of zinc chloride (150 g Zn/l, pH<0.0) was admixed with a sufficient amount of an aqueous ammonium hydroxide solution (26% $NH_3$) in the reactor vessel to provide a reaction solution having pH of about 6.4. Tribasic zinc chloride immediately precipitated out of solution as a white solid. The white solid was collected, dried and weighed to provide an 81.6% yield of tribasic zinc chloride. The tribasic zinc chloride had water solubility of about 23 mg of zinc per liter. The tribasic had zero weight gain when stored in 90% humidity for 140 hours versus a 126.5% weight gain for reagent grade zinc chloride.

EXAMPLE 7

Preparation of Basic Ferrous Chloride

In a procedure as described in Example 4, 100 ml of a pickle liquor containing 130 g/l Fe as ferrous chloride with a free acid content of about 0.36 N (obtained from LTV Inc. located in Hennipin Ill.) was admixed with a 15.1 ml of a 30% ammonium hydroxide solution to provide a dark green slurry of ferrous chloride having a pH of about 5.3 as the starting liquid. The pickle liquor was added to the reactor vessel at a rate of about 3 ml/min.; simultaneously an ammonium hydroxide solution was added to the reactor vessel at a rate of about 0.5 ml/min. to maintain a constant pH of 5.3 in the reactor vessel. The green solid basic ferrous chloride was collected from the reaction mixture. The basic ferrous chloride had a water solubility of about 500 mg per liter.

EXAMPLE 8

Preparation of Basic Maganese Chloride

Basic manganese sulfate is prepared in a procedure as described in Example 4. Initially the reactor vessel contains about 50 to about 100 ml of dionized water. An aqueous solution of manganese sulfate is admixed with a sufficient amount of an aqueous ammonium hydroxide solution (26% $NH_3$) in the reactor vessel to provide a reaction solution having pH between about 2 and about 7.5. The solid basic manganese sulfate precipitates out of the reaction solution.

EXAMPLE 9

Preparation of Basic Maganese Chloride

Basic manganese chloride is prepared in a procedure as described in Example 4. Initially the reactor vessel contains about 50 to about 100 ml of dionized water. An aqueous solution of manganese chloride is admixed with a sufficient amount of an aqueous ammonium hydroxide solution (26% $NH_3$) in the reactor vessel to provide a reaction solution having pH between about 2 and about 7.5. The solid basic manganese chloride precipitates out of the reaction solution.

The present invention contemplates modifications as would occur to those skilled in the art. It is also contemplated that processes embodied in the present invention can be altered, rearranged, substituted, deleted, duplicated, combined, or added to other processes as would occur to those skilled in the art without departing from the spirit of the present invention. In addition, the various stages, steps, procedures, techniques, phases, and operations within these processes may be altered, rearranged, substituted, deleted, duplicated, or combined as would occur to those skilled in the art. All publications, patents, and patent applications cited in this specification are herein incorporated by reference as if each individual publication, patent, or patent application was specifically and individually indicated to be incorporated by reference and set forth in its entirety herein.

Further, any theory of operation, proof, or finding stated herein is meant to further enhance understanding of the present invention and is not intended to make the scope of the present invention dependent upon such theory, proof, or finding.

What is claimed is:

1. A feed supplement comprising at least one pharmaceutically acceptable basic salt of an essential metal provided in a form suitable for consumption by animals, wherein the basic salt is selected from the group of compounds consisting of:
   (a) compounds of the formula $M(OH)_y X_{2-y}$ wherein M is a divalent cation of the essential metal, X is a pharmaceutically acceptable monovalent anion and y is greater than 0 but less than 2, provided that when M is $Cu^{2+}$, X is not chloride;
   (b) compounds of the formula $M(OH)_y X_{(2-y)/2}$ wherein M is a divalent cation of the essential metal, X is a pharmaceutically acceptable divalent anion and y is greater than 0 but less than 2;
   (c) compounds of the formula $M(OH)_y X_{(2-y)/3}$ wherein M is a divalent cation of the essential metal, X is a pharmaceutically acceptable trivalent anion and u is greater than 0 but less than 2;
   (d) compounds of the formula $M'(OH)_u X_{3-u}$ wherein M' is a trivalent cation of the essential metal, X is a pharmaceutically acceptable monovalent anion and u is greater than 0 but less than 3;
   (e) compounds of the formula $M'(OH)_u X_{(3-u)/2}$ wherein M' is a trivalent cation of the essential metal, X is a pharmaceutically acceptable divalent anion and u is greater than 0 but less than 3; and
   (f) compounds of the formula $M'(OH)_u X_{(3-u)/3}$ wherein M' is a trivalent cation of the essential metal, X is a pharmaceutically acceptable trivalent anion and u is greater than 0 but less than 3.

2. The feed supplement of claim 1 wherein the basic metal salt is selected from the group of compounds consisting of:
   (a) compounds of the formula $M(OH)_y X_{2-y}$ wherein M is a divalent cation of the essential metal, X is a pharmaceutically acceptable monovalent anion and y is greater than 0 but less than 2, provided that when M is $Cu^{2+}$, X is not chloride;
   (b) compounds of the formula $M(OH)_y X_{(2-y)/2}$ wherein M is a divalent cation of the essential metal, X is a pharmaceutically acceptable divalent anion and y is greater than 0 but less than 2; and
   (c) compounds of the formula $M(OH)_y X_{(2-y)/3}$ wherein M is a divalent cation of the essential metal, X is a pharmaceutically acceptable trivalent anion and u is greater than 0 but less than 2.

3. The feed supplement of claim 2 wherein the basic metal salt is selected from the group of compounds consisting of the formula $M(OH)_y X_{2-y}$ wherein M is a divalent cation of the essential metal, X is a pharmaceutically acceptable monovalent anion and y is greater than 0 but less than 2, provided that when M is $Cu^{2+}$, X is not chloride.

4. The feed supplement of claim 2 wherein the basic metal salt is selected from the group of compounds consisting of the formula $M(OH)_y X_{2-y}$ wherein M is a divalent cation of the essential metal, X is a pharmaceutically acceptable divalent anion and y is greater than 0 but less than 2.

5. The feed supplement of claim 2 wherein the basic metal salt is selected from the group of compounds consisting of the formula $M(OH)_y X_{(2-y)/3}$ wherein M is a divalent cation of the essential metal, X is a pharmaceutically acceptable trivalent anion and u is greater than 0 but less than 2.

6. The feed supplement of claim 1 wherein the basic metal salt is selected from the group of compounds consisting of:
   (a) compounds of the formula $M'(OH)_u X_{3-u}$ wherein M' is a trivalent cation of the essential metal, X is a pharmaceutically acceptable monovalent anion and u is greater than 0 but less than 3;
   (b) compounds of the formula $M'(OH)_u X_{(3-u)/2}$ wherein M' is a trivalent cation of the essential metal, X is a pharmaceutically acceptable divalent anion and u is greater than 0 but less than 3; and
   (c) compounds of the formula $M'(OH)_u X_{(3-u)/3}$ wherein M' is a trivalent cation of the essential metal, X is a pharmaceutically acceptable trivalent anion and u is greater than 0 but less than 3.

7. The feed supplement of claim 6 wherein the basic metal salt is selected from the group of compounds consisting of the formula $M'(OH)_u X_{3-u}$ wherein M' is a trivalent cation of the essential metal, X is a pharmaceutically acceptable monovalent anion and u is greater than 0 but less than 3.

8. The feed supplement of claim 6 wherein the basic metal salt is selected from the group of compounds consisting of the formula $M'(OH)_u X_{(3-u)/2}$ wherein M' is a trivalent cation of the essential metal, X is a pharmaceutically acceptable divalent anion and u is greater than 0 but less than 3.

9. The feed supplement of claim 6 wherein the basic metal salt is selected from the group of compounds consisting of the formula $M'(OH)_u X_{(3-u)/3}$ wherein M' is a trivalent cation of the essential metal, X is a pharmaceutically acceptable trivalent anion and u is greater than 0 but less than 3.

10. The feed supplement of claim 1 wherein M is selected from the group consisting of $Mg^{2+}$, $Ca^{2+}$, $Fe^{2+}$, $Mn^{2+}$, $Cu^{2+}$, $Zn^{2+}$ and $Co^{2+}$.

11. The feed supplement of claim 1 wherein M' is selected from the groups consisting of $Co^{3+}$, $Fe^{3+}$ and $Cr_3+$.

12. The feed supplement of claim 1 wherein X is selected from the group consisting of halide, carbonate, bicarbonate, sulfate, sulfite, bisulfate, bisulfite, phosphate, monohydrogen phosphate, dihydrogen phosphate, metaphosphate, pyrophosphate, nitrate and nitrite.

13. The feed supplement of claim 1 wherein M is $Zn^{2+}$ and X is sulfate or chloride.

14. The feed supplement of claim 13 wherein y is greater than 1.0 but less than or equal to 1.5.

15. The feed supplement of claim 1 and further comprising at least one flavorant.

16. A method of enhancing vitamin stability in a nutrient composition containing at least one inorganic salt, said method comprising providing as the inorganic salt a basic salt of an essential metal selected from the group consisting of:
   (a) compounds of the formula $M(OH)_y X_{2-y}$ wherein M is a divalent cation of the essential metal, X is a pharmaceutically acceptable monovalent anion and y is greater than 0 but less than 2, provided that when M is $Cu^{2+}$, X is not chloride;
   (b) compounds of the formula $M(OH)_y X_{(2-y)/2}$ wherein M is a divalent cation of the essential metal, X is a pharmaceutically acceptable divalent anion and y is greater than 0 but less than 2;
   (c) compounds of the formula $M(OH)_y X_{(2-y)/3}$ wherein M is a divalent cation of the essential metal, X is a pharmaceutically acceptable trivalent anion and y is greater than 0 but less than 2, (d) compounds of the formula $M'(OH)_u X_{3-u}$ wherein M' is a trivalent cation of the essential metal, X is a pharmaceutically acceptable monovalent anion and u is greater than 0 but less than 3;

(e) compounds of the formula $M'(OH)_u X_{(3-u)/2}$ wherein M' is a trivalent cation of the essential metal, X is a pharmaceutically acceptable divalent anion and u is greater than 0 but less than 3; and (f) compounds of the formula $M'(OH)_u X_{(3-u)/3}$ wherein M' is a trivalent cation of the essential metal, X is a pharmaceutically acceptable trivalent anion and u is greater than 0 but less than 3.

17. The method of claim 16, wherein M is selected from the group consisting of $Mg^{2+}$, $Ca^{2+}$, $Fe^{2+}$, $Mn^{2+}$, $Zn^{2+}$ and $Co^{2+}$.

18. The method of claim 16 wherein M is $Zn^{2+}$ and X is sulfate or chloride.

19. The method of claim 16 wherein y is greater than about 1.0 and less than or equal to 1.5.

20. The method of claim 16 wherein X is selected from the group consisting of halide, carbonate, bicarbonate, sulfate, sulfite, bisulfate, bisulfite, phosphate, monohydrogen phosphate, dihydrogen phosphate, metaphosphate, pyrophosphate, nitrate and nitrite.

21. The method of claim 16 wherein said nutrient composition is effective to enhance the survivability, growth, health, or reproductivity of humans or other animals.

* * * * *